United States Patent
Robinson

(10) Patent No.: US 7,340,266 B2
(45) Date of Patent: Mar. 4, 2008

(54) METHOD AND APPARATUS FOR COMMUNICATING WITH MULTIMODE RECEIVING DEVICE IN NON-SYNCHRONIZED WIRELESS SYSTEMS

(75) Inventor: William Neil Robinson, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 10/324,702

(22) Filed: Dec. 20, 2002

(65) Prior Publication Data

US 2004/0203965 A1 Oct. 14, 2004

(51) Int. Cl.
- H04B 7/00 (2006.01)
- H04B 1/38 (2006.01)
- H04M 1/00 (2006.01)
- H04J 3/06 (2006.01)

(52) U.S. Cl. ............... 455/502; 455/552.1; 455/553.1; 370/350

(58) Field of Classification Search ........... 455/552.1, 455/553.1, 502, 66.1, 557, 574, 556.1, 556.2; 370/350; 375/272, 354

See application file for complete search history.

(56) References Cited

U.S. PATENT DOCUMENTS

| | | | | |
|---|---|---|---|---|
| 5,697,062 A * | 12/1997 | Hendrickson | ............... | 455/502 |
| 5,790,527 A | 8/1998 | Janky et al. | | |
| 5,809,419 A * | 9/1998 | Schellinger et al. | ........ | 455/434 |
| 5,924,039 A * | 7/1999 | Hugenberg et al. | ......... | 455/454 |
| 6,081,571 A * | 6/2000 | Jansson | ...................... | 375/376 |
| 6,185,429 B1 * | 2/2001 | Gehrke et al. | .............. | 455/502 |
| 6,246,886 B1 * | 6/2001 | Oliva | ...................... | 455/426.1 |
| 6,308,068 B1 * | 10/2001 | Kunkel | ........................ | 455/434 |
| 6,393,006 B1 * | 5/2002 | Kajihara | ...................... | 370/335 |
| 6,456,858 B1 * | 9/2002 | Streter | ...................... | 455/552.1 |
| 6,487,399 B1 * | 11/2002 | Rajaniemi et al. | ........ | 455/226.1 |
| 6,590,881 B1 * | 7/2003 | Wallace et al. | ............. | 370/332 |
| 6,636,747 B2 | 10/2003 | Harada et al. | | |
| 6,725,058 B2 * | 4/2004 | Rinne et al. | ............. | 455/553.1 |
| 6,741,836 B2 * | 5/2004 | Lee et al. | ................... | 455/41.2 |
| 6,745,017 B2 * | 6/2004 | Meehan | ................... | 455/277.1 |
| 6,785,352 B1 | 8/2004 | Ranta | | |
| 7,050,828 B2 * | 5/2006 | Stattin et al. | ............. | 455/553.1 |
| 7,079,811 B2 * | 7/2006 | Lee et al. | ................... | 455/41.2 |
| 2003/0087654 A1 * | 5/2003 | Wheeler | ...................... | 455/502 |

OTHER PUBLICATIONS

U.S. Patent Office International Search Report for International Application No. PCT/US03/39339, dated Nov. 1, 2004.

* cited by examiner

Primary Examiner—Tilahun Gesesse
(74) Attorney, Agent, or Firm—Vedder Pride P.C.

(57) ABSTRACT

An apparatus, such as a network element (112), for use in a system that communicates with a multimode receiving device (110), employs an information gating buffer (400) that is operably coupled to a first wireless system transmitter (404) and receives information to be transmitted by the first wireless system transmitter (404). A synchronization controller (402), operably coupled to the information gating buffer (400) receives synchronization information (132) from a second wireless system using a second wireless system receiver circuit (130), and uses the timing synchronization information (132) to control the information gating buffer (400) to gate broadcast information for transmission from a first wireless system transmission circuit (128) to the multimode receiving device (110). A method includes receiving (200) timing synchronization information from the first wireless system, and using (204) the timing synchronization information to gate the transmission of information transmitted from the second wireless system to the multimode receiving device.

12 Claims, 6 Drawing Sheets

US 7,340,266 B2

METHOD AND APPARATUS FOR COMMUNICATING WITH MULTIMODE RECEIVING DEVICE IN NON-SYNCHRONIZED WIRELESS SYSTEMS

FIELD OF THE INVENTION

The invention relates generally to wireless communication methods and apparatus, and more particularly to the synchronization of information with a multimode receiving device that communicates with a plurality of different types of wireless systems.

BACKGROUND OF THE INVENTION

Multimode receiving devices are known, such as mobile or non-mobile devices that have transceivers that can communicate with differing types of wireless systems. For example, multimode receiving devices may include, for example, a cell phone, internet appliance, PDA, laptop, or any other suitable device that can communicate with differing wireless systems such as a TDMA cellular system and WCDMA cellular system. In addition, differing wireless systems may include a cellular system and a digital broadcast system. With differing systems that are not synchronized in the time domain, it can be difficult to ensure the coordination of information flow between the multiple systems and one or more multimode receiving devices, such as a mobile or non-mobile receiving device, to avoid loss of information since the processing load for the multimode receiving device increases when information is being sent simultaneously over both systems to a receiving device. Hence, more complicated and costly processors can be required in multimode receiving devices.

Some multimode receiving devices are known that have, for example, two independent receive chains (and transmit chains) such that they have dual receivers, one receiver dedicated to each of the different wireless systems. For example, with WCDMA and group special mobile systems (GSM) multimode systems, a multimode receiving device may scan and find, for example, the GSM system when the WCDMA system is operating in a discontinuous mode. For example, in a discontinuous mode, the WCDMA system is not in time synchronization with a GSM system and sooner or later, the multimode receiving device will locate a GSM channel, but the eventual location can waste bandwidth of a WCDMA transmission. As such, inefficient processing can occur.

Single mode systems are known such as a system that uses, for example, a global positioning satellite system to provide a synchronized time base for a cellular base site. However, such systems are single mode systems in that the receiving devices, such as the mobile devices, communicate via the cellular system only. Such GPS and cellular systems merely synchronize a single communication system, namely the cellular system, to a common GPS clock.

Also, it is known for cellular systems and other wireless systems to have a type of control channel that, for example, contains synchronization information to allow devices to synchronize to a cellular system. This may take, for example, the form of a paging channel or a timing synchronization channel or any other suitable channel or information. However, typically, such cellular synchronization data is not in synchronization with a different wireless system for a multimode receiving device. Accordingly, if a multimode receiving device, for example, is listening on its synchronization channel and the second wireless system, such as a digital broadcast system is broadcasting information, the broadcast information may not be detected by the multimode device or if detected, requires the device's processor to process information from both systems at essentially the same time.

For example, multimode systems are also known that have a mobile multimode receiving device that includes a receiver (and antenna) for receiving cellular information and another receive chain and an antenna combination for receiving digital broadcast information. However, if the multimode receiving device (which also may be a transmitting device if desired), receives digital broadcast information at the same time as it is listening to a cellular paging channel, the loading on the processor can be quite large.

It would be desirable to have an apparatus and method so that a less expensive processor may be used that would also potentially draw less current and for mobile devices, result in a longer lasting battery and a smaller device. Therefore, it would be desirable to better balance the processing load over time.

BRIEF DESCRIPTION OF THE DRAWINGS

The present invention is illustrated by way of example and not limitation in the accompanying figures, in which like references numerals indicate similar elements, and in which.

DETAILED DESCRIPTION OF THE PREFERRED EMBODIMENT

Figure 1:
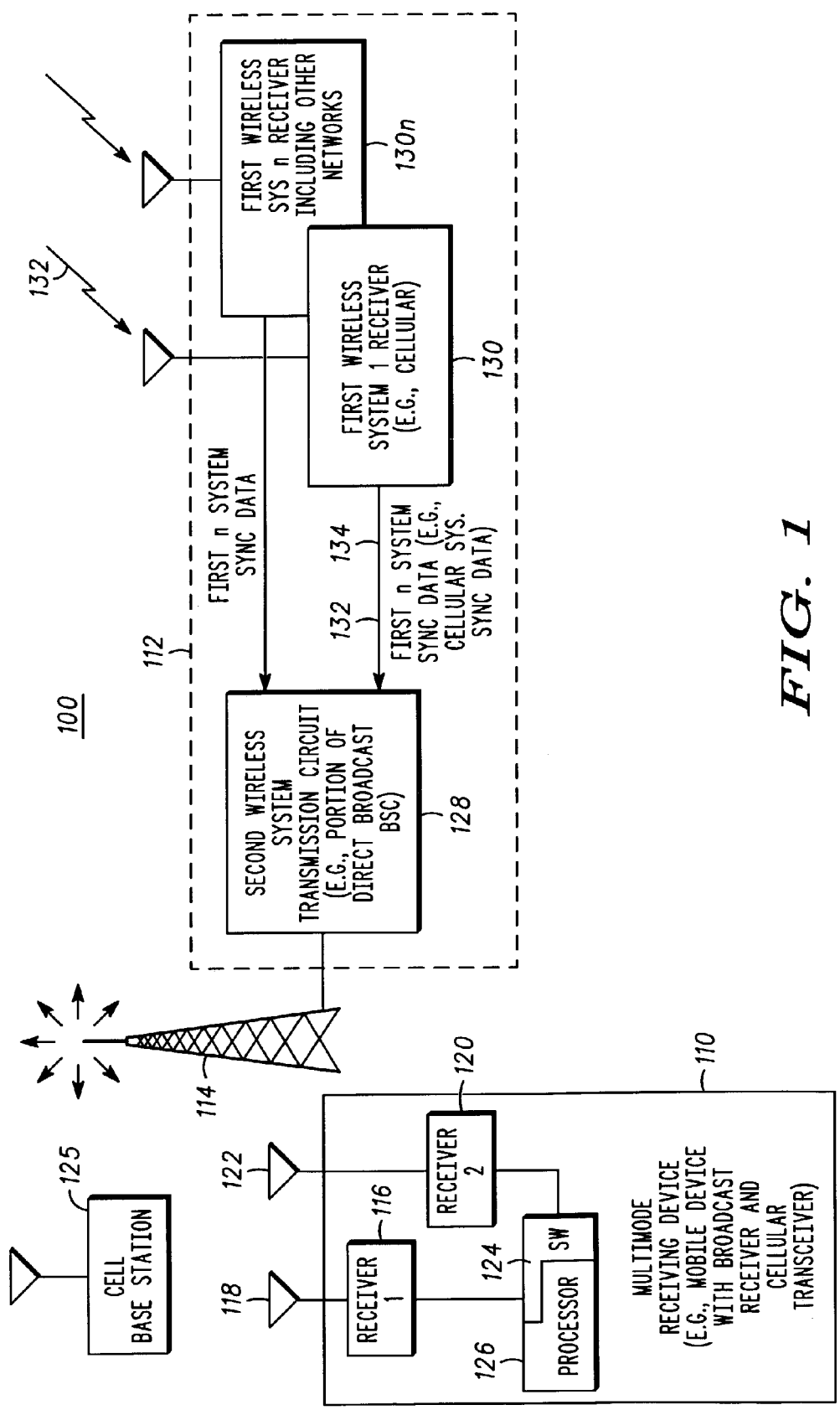
FIG. 1 is a block diagram illustrating one example of a multimode communication system in accordance with one embodiment of the invention.

Briefly, an apparatus, such as a network element, for use in a system that communicates with a multimode receiving device, employs a first wireless system transmitter, such as a broadcast system transmission circuit, to transmit or broadcast information to the multimode receiving device. An information gating buffer is operably coupled to a first wireless system transmitter and receives information to be transmitted by the first wireless system transmitter. A synchronization controller, operably coupled to the information gating buffer receives synchronization information from a second wireless system, such as from a cellular system, using a second wireless system receiver circuit, such as a cellular receiver tuned to receive a paging channel, and uses the timing synchronization information to control the information gating buffer to gate noncellular information for transmission from the first wireless system transmitter to the multimode receiving device. For example, in the case where the plurality of different wireless systems is a digital broadcast system and a cellular system, a digital broadcast transmission circuit, such as a portion of a broadcast base site controller, receives synchronization information from a co-located or non-co-located cellular receiver to determine the synchronization periods that are used by a multimode receiving device to listen for cellular synchronization information. The synchronization controller effectively pauses the broadcast of noncellular transmitted data over a digital broadcast antenna during the time when the multimode receiving device is listening on the cellular paging channel to avoid the sending of broadcast information on a non-synchronized system that may arrive at the multimode receiving device at the same time the multimode receiving device is listening for information from the other system. When the synchronization period is over, the second wireless system then transmits the buffered broadcast information and broadcasts it to the multimode receiving device. Hence, the information processing loading on the multimode receiving device is effectively delayed so that the processing operations in the multimode receiving device need only process information from one of the plurality of non-synchronized systems at any one time.

A method is also disclosed that includes receiving timing synchronization information from a first wireless system, such as a cellular system, or other wireless system and using the timing synchronization information from the first wireless system to gate the transmission of information transmitted from a second wireless system, such as a digital broadcast system or other wireless system, to the multimode receiving device. From the perspective of the multimode receiving device, a method is disclosed that includes switching to receive information from the first wireless system during a synchronization period based on timing synchronization information from the first wireless system and switching back to another receiver to receive gated information from a second wireless system after the synchronization period has ended, wherein the gated information is transmitted from the second wireless system and was gated, by a network element, based on timing synchronization information from the first wireless system.

As such, the predetermined synchronization periods of one wireless system are used such that a digital broadcast system or other wireless system gates or controls information flow from the multimode receiving device, such as a mobile device or non-mobile device, to schedule transmission of broadcast information in such a way that the communication from the broadcast system does not occur at the same time as the mobile device (i.e., the multimode receiving device) is transmitting or receiving data from the other wireless system. By gating the information on one system, the multimode receiving device does not require, for example, a complete dual receiver architecture and instead can have, for example a configurable receiver that shares some configurable portions among a plurality of receivers and additionally the loading on one or more processors may be more consistent so that a lower cost processor scheme may be used if desired. Other advantages will be recognized by those having ordinary skill in the art.

FIG. 1 illustrates one example of a multimode communication system 100 in accordance with one embodiment of the invention that includes a multimode receiving device 110 a network element 112 and an antenna 114. By way of example only, and not limitation, the invention will be described with reference to a multimode system that includes a cellular system and a digital broadcast system. However, the invention is equally applicable to any suitable multimode system, including, but not limited to, multiple mode systems employing different types of cellular systems, such as CDMA as one system and TDMA system as another, or any suitable multimode system that employs a plurality of wireless systems wherein the wireless systems are not synchronized in a time domain. As shown in this example, the first system in this example is considered to be a cellular system and a second system may be a multicast broadcast system, or a point cast system or any other suitable digital broadcast system. However, it will be recognized that any suitable systems may be employed.

The multimode receiving device 110 is a device that at least receives information from both of the non-synchronized systems. Also by way of example, and not limitation, multimode receiving device 110 will be referred to as a mobile device such as a cell phone, PDA, internet appliance, laptop computer, or any other suitable mobile device. However, the invention is equally applicable to non-mobile devices that serve as multimode receiving devices that or at least receive information from a plurality of different wireless systems that are not synchronized in a time domain. The multimode receiving device 110 includes a first wireless receiver 116 and associated antenna 118 for receiving, for example, information from a first wireless system, such as the cellular system. The wireless multimode receiving device 110 also includes at least a second wireless receiver 120 and corresponding antenna 122 operative to receive wireless information from a second wireless system, such as a wireless digital broadcast system. The receivers 116 and 120 may be conventional receivers as known in the art. Although two antennas are shown, it will be recognized that if appropriate, a single antenna could be used.

For purposes of illustration only, and not limitation, antenna 122 therefore receives broadcast information from broadcast antenna 114 whereas antenna 118 receives cellular information from one more cellular base stations 125. Each of the first and second wireless receivers 116 and 120 are operably coupled to a switching mechanism 124, which in this example is shown to be incorporated as part of control logic 126. The control logic 126 in this example takes the form of a programmed processor that executes instructions that are stored in a memory (not shown). However, any suitable structure may be used, including, but not limited to discreet logic, state machines DSPs, microcontrollers, CPUs, or any suitable combination of hardware, software or firmware as desired.

The control logic 126 is operably coupled to the switching mechanism 124 in this example. The switching mechanism 124 may be, for example, controllable ports on a processing device which are selected or otherwise accessed by the processor, and the control logic 126 is operative to switch the switching mechanism 124 to the first wireless receiver 116 to receive information from the first wireless receiver 116 during a synchronization period of the cellular system, based on timing synchronization from the cellular system. For example, the control logic 126 may switch the receiver 116 to access a paging channel during a synchronization period associated with the cellular system. The control logic 126 also controls the switching mechanism 124 to switch back to receiving information from the second receiver 120 after the synchronization period has ended. As such, when the multimode receiving device is listening to a cellular paging channel, the control logic 126 controls the switching mechanism 124 to receive information from the paging channel through receiver 116. As such the control logic 126 need not process information from the other system. As such the multimode receiving device 110 listens to either a cellular channel or direct broadcast channel at any one time.

The network element 112 includes a wireless transmission circuit 128, in this case a second wireless system transmission circuit may be for example a portion of a direct broadcast base station controller, or any other suitable network element. The wireless system transmission circuit 128 is operative to transmit information, such as broadcast information, over the wireless broadcast system, to the multi-mode receiving device 110 via antenna 114. In this embodiment, the network element 112 also includes a cellular wireless system receiver circuit 130 that is operative to wirelessly receive synchronization information, such as synchronization information from a cellular paging channel, transmitted over the cellular wireless system. The wireless system receiver 130 may be a conventional cellular receiver that may be for example co-located as part of the network element 112 such as a broadcast base site controller if desired. However, as described for example with reference to FIG. 4, the wireless system receiver 130 need not be co-located and instead may be remotely located if desired. The wireless system receiver 130 receives synchronization information from the cellular base station 124 or any other suitable base station within the same cellular system. The timing synchronization information 132, such as frame and slot timing, as noted, may be received for example from a paging channel of the cellular system. The wireless system receiver 130 receives the timing synchronization information 132 from the cellular wireless system. The wireless system receiver 130 provides the timing synchronization information 132 to the wireless broadcast system transmission circuit 128. As such, synchronization information from one wireless system is provided to a transmission circuit of the other and non-synchronized system. By way of example, the timing synchronization information 132 may be translated by the wireless system receiver 130 into timing synchronization data 134 that may be for example a synchronization period or other suitable data of when to begin and/or end the buffering of broadcast information as described further below.

In the context of these specific examples, the second wireless system transmission circuit 128 may be a digital broadcast transmission circuit that is operative to transmit digital broadcast information via antenna 114 to the multi-mode receiving device 110. Likewise, the wireless system receiver 130 may be a cellular system receiver circuit that is operative to wirelessly receive synchronization information associated with a cellular system and operative to provide timing synchronization information or timing synchronization data based on the synchronization information to the broadcast system transmission circuit.

In addition if desired, a plurality of wireless system receivers 130 through 130n may provide synchronization information to the wireless transmission circuit 128 wherein each of the wireless system receivers 130-130n receive timing synchronization information from differing non-synchronized wireless systems or different base stations of the same system.

As such, in the embodiment where the differing non-synchronized systems include for example a digital broadcast system and a cellular system, such as GSM system, as a combined service to a multi-mode receiving device using separate DXB (digital audio and/or digital video broadcast) and GSM networks, a GSM mobile phone receiver for example might serve as the system receiver 130 and may be located as part of DXB base station controller. The GSM receiver (system receiver 130) is tuned to the control channel of a preferred GSM network. The GSM receiver acquires a GSM control channel and synchronizes to it. The GSM receiver provides the synchronization dated, or pulse, or other suitable information, to the DXB transmitter (the wireless system transmission circuit 128) at predetermined points in the GSM slot and frame structure. These predetermined points are arranged such that the broadcast information transmitted by the wireless system transmission circuit 128 is scheduled such that the transmission does not occur at the same time as the multimode receiving device 110 is transmitting or receiving GSM information. By doing this, the multimode receiving device does not require a dual receiver architecture and can have for example a single configurable receiver. Additionally, the digital broadcast information can be scheduled such that it does not coincide with the GSM operation of scanning adjacent GSM cells.

Figures 2, 3:
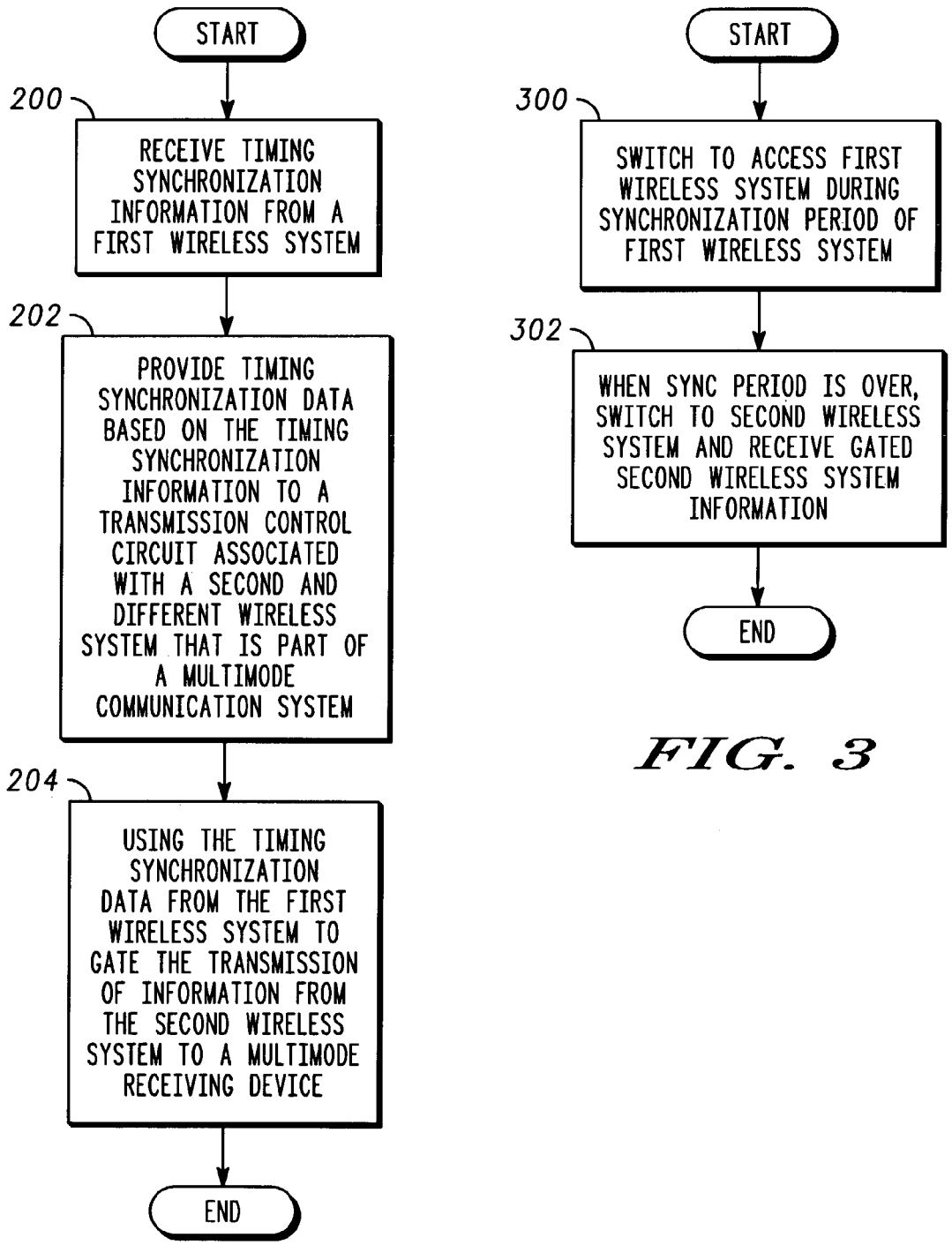
FIG. 2 is a flowchart illustrating one example of a method for communicating with a multimode receiving device that receives information from a first and second wireless system that are not synchronized in the time domain, in accordance with one embodiment of the invention.
FIG. 3 is an example of a method for communicating with a multimode receiving device in accordance with one embodiment of the invention.

FIG. 2 illustrates one example of a method for communicating with a multimode receiving device in accordance with one embodiment of the invention as carried out, for example, by the network element 112 of FIG. 1. However, any suitable component or group of components may carryout the steps. In block 200, the method includes receiving timing synchronization information from a wireless system, such as a cellular system, for example, using wireless system receiver 130 or other suitable receiver. As shown in block 202, the wireless system receiver, or any other suitable element or group of elements provides timing synchronization information 132 to the transmission control circuit 128 associated with a different wireless system, in this example, a direct broadcast system or other suitable system as part of the multimode communication system 100. As shown on block 204, the method includes using the timing synchronization information 132 from the cellular wireless system to gate the transmission of information from the second wireless system, such as the direct broadcast system, to the multimode receiving device. This may include for example pausing the broadcast data over the digital broadcast network during at least a portion of a synchronization period defined by the synchronization information 132.

FIG. 3 is a flow chart illustrating a method for communicating with a multimode receiving device taken, for example, from the perspective of a multimode receiving device. During the synchronization period, for example, the multimode receiving device, or other suitable device uses control logic 126 to switch to access the first wireless system, such as a cellular system during the synchronization period of the first wireless system. This is shown in block 300. As shown in block 302, when the synchronization period is over, the method includes switching to the second wireless system via the second wireless receiver 120 to receive the gated information that is communicated over the second wireless system, such as gated broadcast information.

Figure 4:
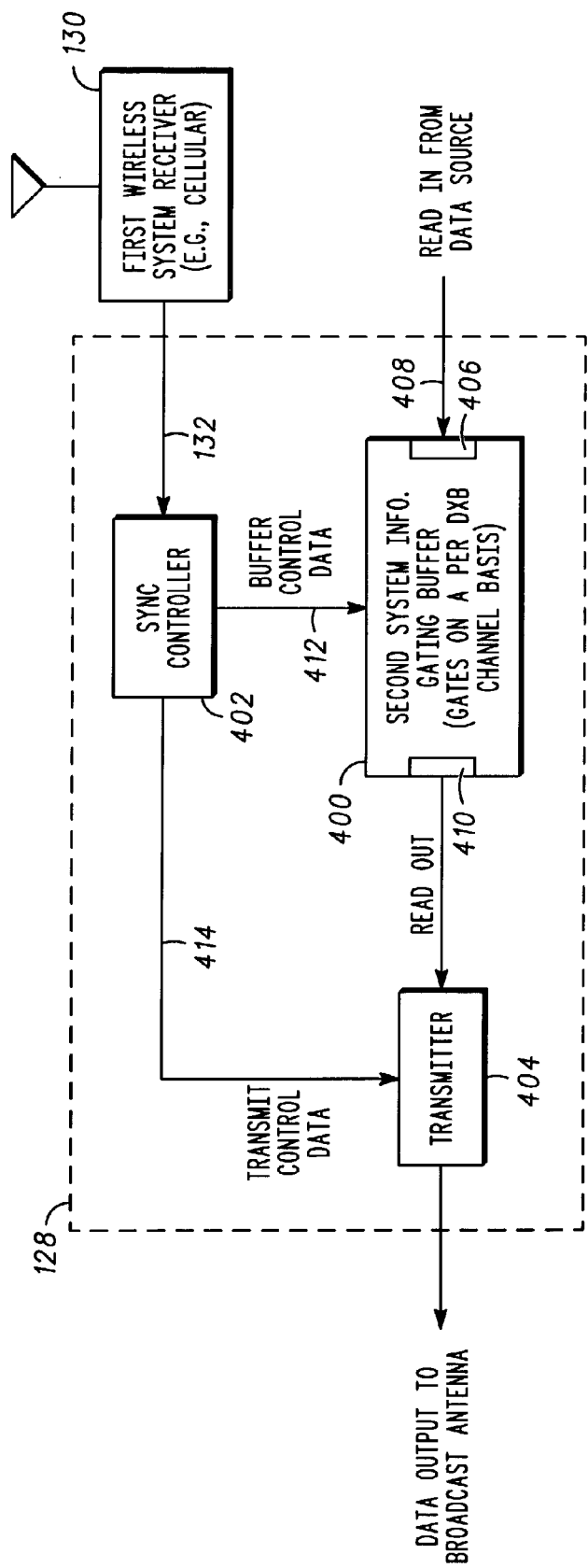
FIG. 4 is a block diagram illustrating one example of a network element for use in a system that communicates with a multimode receiving device in accordance with one embodiment of the invention.
Figure 5:
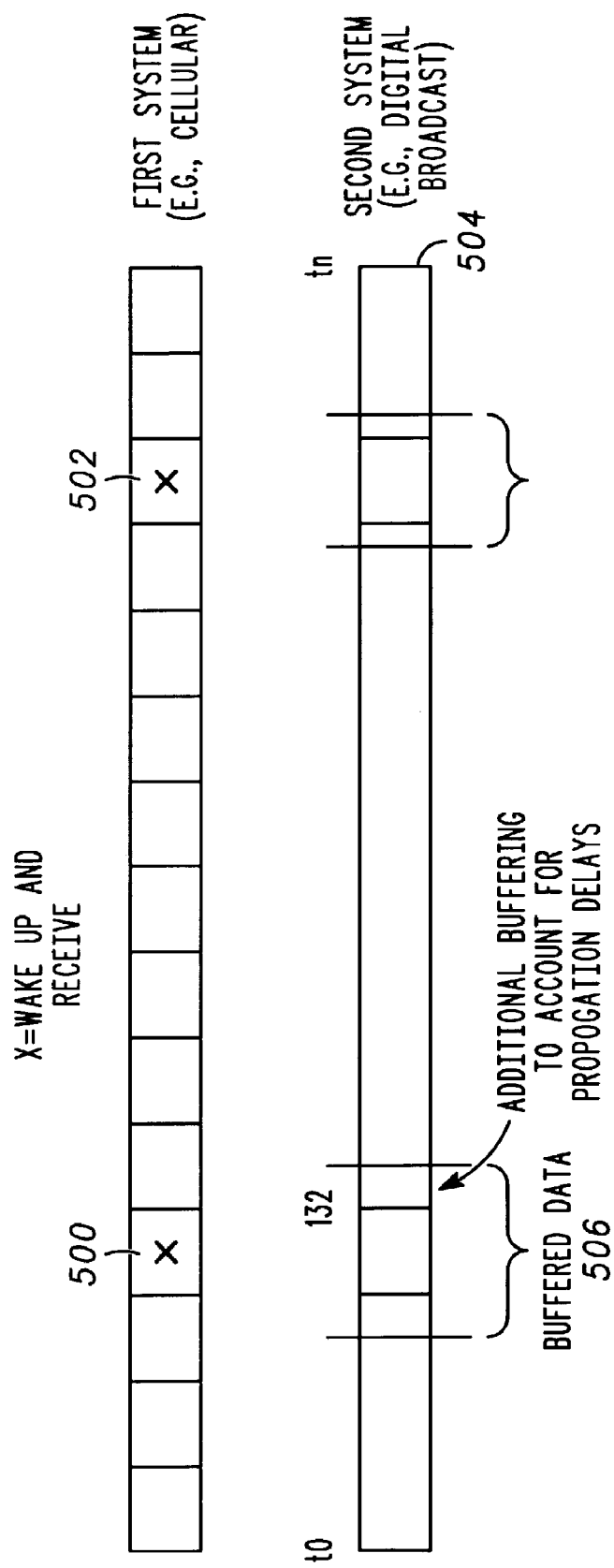
FIG. 5 is a diagrammatic representation of gating of information based on timing synchronization information in accordance with one embodiment of the invention.
Figure 6:
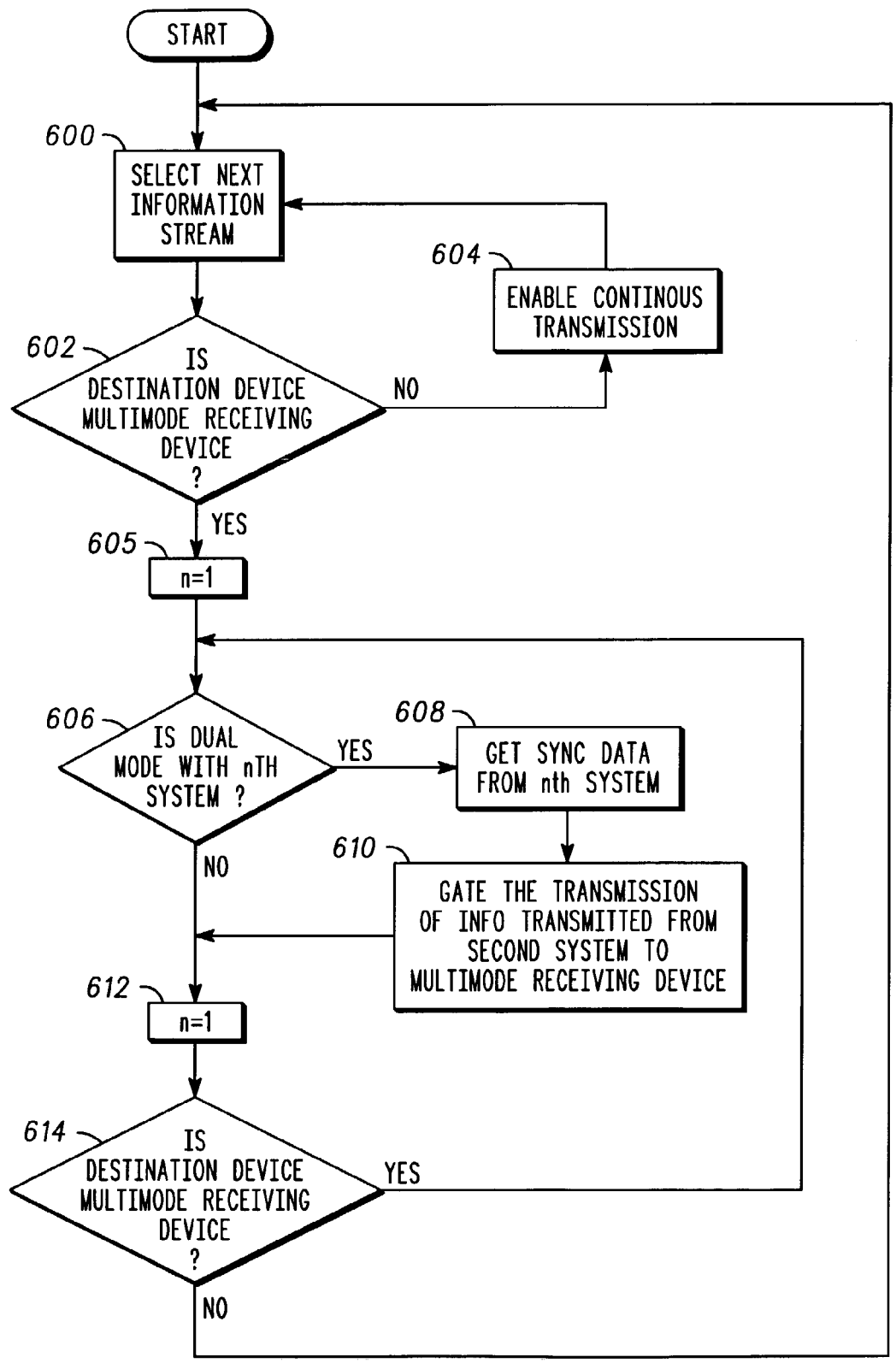
FIG. 6 is a flowchart illustrating one example of a method used for communicating with a multimode receiving device in accordance with one embodiment of the invention.

Referring to FIG. 4-6, a more detailed description the operation of the wireless system transmission circuit 128 will be described. The wireless system transmission circuit 128 includes an information gating buffer 400 a synchronizing controller 402 and a transmitter 404. The synchronization controller 402 may be any suitable logic circuit, programmable processing device or any suitable combination of hardware, software or firmware. The transmitter may be any conventional transmitter circuitry. The information gating buffer 400 may be any suitable buffering mechanism. The information gating buffer has an input 406, such as an input port or other suitable input operably coupled to receive source information 408 to be transmitted over antenna 114 via the transmitter 404. Information gating buffer 400 also has an output 410 operably coupled to the transmitter 404. The synchronization controller 400 is operably coupled to the information gating buffer 400 and receives the timing synchronization information 132 associated with the different wireless system. The synchronization controller 400 generates buffer control data 412, which controls the gating of information from buffer 400 based on the timing synchronization information 132. The synchronization controller 402 uses the timing synchronization information 132 to control the information gating buffer 400 to gate information for transmission from the wireless transmission circuit 128 to the multimode receiving device 110. In one example, the synchronization controller 402 generates a control signal 414 to the transmitter 404 to effectively turn on and turn off transmission of data read out from the information gating buffer 400. As such, the transmitter 404 may be turned off to conserve power based on the control signal 414 at an appropriate time. The information gating buffer 400 buffers information for a period of time determined by the synchronization controller 402 and then the synchronization controller 402 activates the transmitter 404 to read the buffered data out for transmission over the antenna 114. As applied to a digital broadcast system, the information gating buffer 400 is be a broadcast information gating buffer that receives information to be broadcast by the broadcast transmission circuit (wireless system transmission circuit 128) via the transmitter 404. Also in the embodiment in FIG. 4, the wireless system receiver 130 may be a cellular system receiver circuit that is not co-located with the wireless system transmission circuit. But is operative to provide timing synchronization data based on synchronization information from the cellular system. The synchronization controller 402 controls the buffering of information during at least a portion of the synchronization period associated with the timing synchronization information.

For example, referring to FIG. 5, in the time domain, time slots 500 and 502 associated with the first wireless system, such as a cellular system, define the wakeup and receive slots in a paging channel. Transmitted information 504 represents the information transmitted from the second wireless system transmission circuit 128. As noted, the timing synchronization information 132 may represent a synchronization period during which time the multimode receiving device 110 listens to a particular slot on a paging channel or scanning for a synchronization block on a channel. During this time, the synchronization controller 402 controls the information gating buffer 400 using the buffer control data 412 to buffer data during the synchronization period 132 and, if desired, due to progation delays or other delays, experienced by device 110, for a period of time longer than the synchronization period represented as buffered data 506. As such, while the multimode receiving device is listening on a cellular paging channel, no information is being broadcast by the nonsynchronized broadcast system but the nonsynchronized broadcast system becomes synchronized by buffering information during the time that the multimode receiving device is listening to the other network. After the buffering period has lapsed, the synchronization controller activates the transmitter 404 to read out the buffered data to transmit the buffered broadcast information after the synchronization period has ended.

FIG. 6 represents an example of the operation of the synchronization controller 402 when a plurality of wireless system receivers 130 through 130N may be employed. Buffering is preferably done on a per broadcast channel basis in this example. As such, in block 600, the method includes selecting the next information stream from a data source 408 to be transmitted by the digital broadcast system or transmission circuit 128. This may be done, for example, through a round robin priority or any other suitable priority. As shown in block 602, the method includes determining if the destination device is a multimode device. For example, through a prior knowledge (e.g. data stored in a database), or signaling from the multimode device or if the service is a multimode service. If the destination device is not a multimode receiving device, the method includes, as shown in block 604, enabling continuous transmission of source data 408 to antenna 114. As such, the information gating buffer 400 may be effectively bypassed and the transmitter activated to allow transmission of information to be broadcast continuously.

Referring back to block 602, if the destination device is a multimode receiving device, the method includes incrementing a counter shown in block 605. As shown in block 606, the method includes determining if the associated multimode receiving device is part of a multimode system for which the transmission circuit is coupled. In other words, the transmission circuit 128 identifies if it is receiving synchronization information from a wireless system receiver 130-130n that has been assigned to this multimode receiving device. The broadcast system knows the subscribers to the service. As shown in block 608, if the multimode receiving circuit is part of a system for which the wireless system transmission circuit 128 receives synchronization information from, the synchronization information is then obtained from that particular wireless system receiver circuit. For example, the plurality of wireless system receiver circuits 130-130n are operatively coupled to the synchronization controller 402 and each of them provides wirelessly received timing synchronization information from one or more wireless systems. Once the timing synchronization information is obtained, the synchronization controller 402 uses the timing synchronization information to control the information gating buffer to gate the information for transmission from the broadcast transmission circuit to the multimode receiving device. In other words, the broadcast wireless system schedules a gap in transmission with respect to the timing synchronization information from the cellular system on a per channel basis as shown in block 610. As shown in block 612, the counter is then incremented and a next destination device is evaluated to determine whether the next destination device is a multimode receiving device as shown in block 614. If so, the method reverts back to block 606. If not, a next information stream is selected as shown in block 600.

Figure 7:
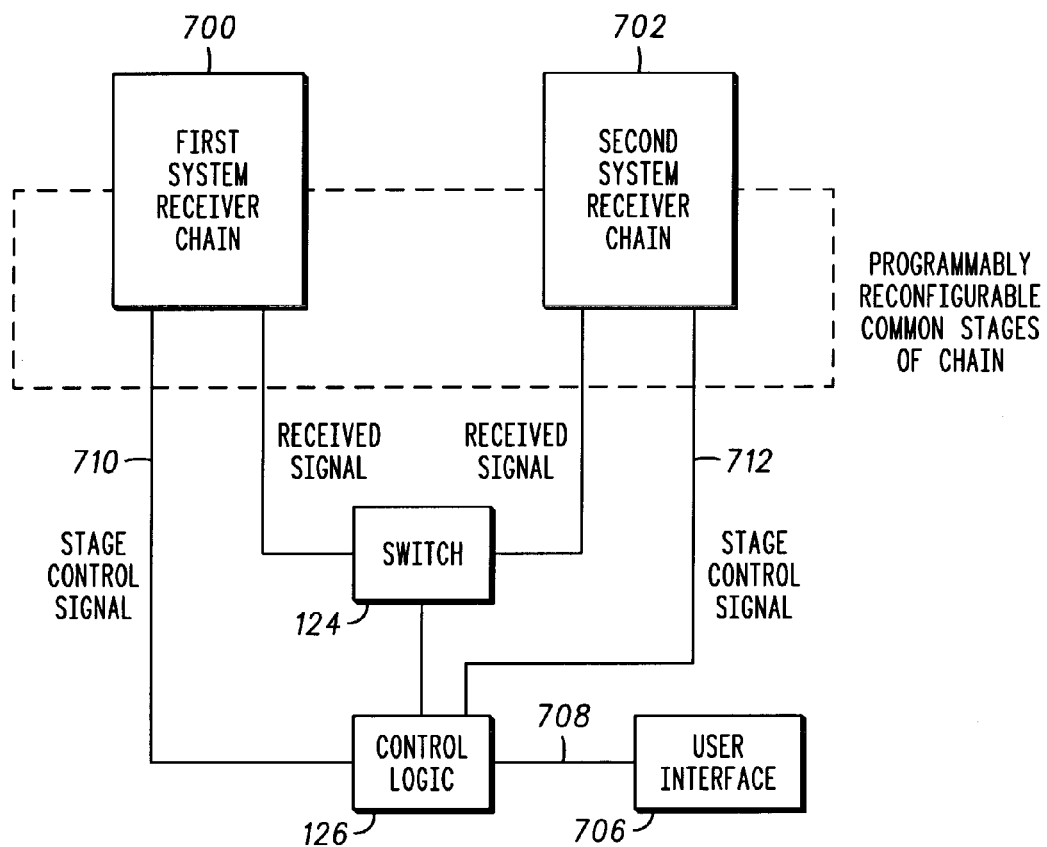
FIG. 7 is a block diagram illustrating one example of a wireless multimode receiving device in accordance with one embodiment of the invention.

FIG. 7 is a block diagram illustrating one example of a portion of a multimode receiving device 110 in accordance with one embodiment to the present invention. The multimode receiving device 110 includes a first system receiver chain 700, a second system receiver chain 702, a switching mechanism 124, the control logic 126 and a user interface 706. The user interface 706 may be, for example, a touch screen, keypad or any other suitable user interface, and is used to allow the user to indicate (select) whether to, for example, make a call on a cellular network or receive broadcast information on a different and non-synchronized network. As such, the user interface 706 presents the user with a selection menu to select effectively which features the user wishes to use and hence the associated network. The selection information 708 is provided to the control logic 126, which then activates a switch 124 to switch to the first system receiver chain or second system receiver chain 700, 702 depending upon the selected system. Also, the control logic 126 automatically switches to the cell system periodically when receiving broadcast data to obtain paging messages or other suitable information.

In this embodiment, each of the system receiver chains includes a common programmable receiver stage such as gain stages or other suitable stages that may be programmably reconfigured via control logic 126, via stage control signals 710 and 712 respectively. As such, additional cost savings may be provided by reusing portions of the receiver chain since only one receiver is providing information at any one time. Error correction processors, packet data reconstruction operations or other elements may also be reconfigured. The stage control signals 710 and 712 may be, for example, enable lines or circuits to enable and disable sections of a receiver chain, such as an amplification stage or other suitable stages if desired.

The above apparatus and methods, among other advantages, gate in broadcast information or other system information when, for example, a mobile device or other multimode receiving device is listening to a synchronization channel on a non-synchronized network such as a cellular network. Hence, the multimode receiving device, which also may have suitable transmitter stages, receives information from one system to a point where after the multimode receiving device switches to a different receiver and receives gated information from a different network. The multimode receiving device switches to a second receiver to receive gated information transmitted from a first wireless system (e.g. broadcast system) that was gated, such as by, for example, a network element, based on timing synchronization information from the second wireless system. As such, an onboard processor, plurality of processors or other suitable logic, need not process information from two differing systems at the same time. In addition, if propagation delays and multipath signals are being received by the multimode receiving device, the gated information at the broadcast network element is gated for a longer period of time to accommodate for the multipath delays. Other advantages will be recognized by those skilled in the art.

The above detailed description of the invention and the examples described therein have been presented for the purposes of illustration and description. It is therefore contemplated that the present invention cover any and all modifications, variations or equivalents that fall within the spirit and scope of the basic underlying principles disclosed above and claimed herein.

What is claimed is:

1. A method for communicating with a multimode receiving device that at least receives information from a first and a second wireless system, that are not synchronized in a time domain, comprising:
   receiving timing synchronization information from the first wireless system;
   using the timing synchronization information from the first wireless system to gate a transmission of information transmitted from the second wireless system to the multimode receiving device; and
   wherein receiving timing synchronization information from the first wireless system includes receiving, by a first system receiver, co-located with a second wireless system transmission control circuit, producing, by the first system receiver, first system synchronization data for a synchronization controller.

2. The method of claim 1 including:
   switching to receive information from the first wireless system during a synchronization period based on timing synchronization information from the first wireless system; and
   switching back to receive gated information from the second wireless system after the synchronization period has ended wherein the gated information is transmitted from the second wireless system and was gated, by a network element, based on timing synchronization information from the first wireless system.

3. A wireless multimode receiving device comprising:
   at least a first wireless receiver operative to receive wireless information from a first wireless system;
   at least a second wireless receiver operative to receive wireless information from a second wireless system;
   a switching mechanism, operatively coupled to the first and second wireless receivers; and
   control logic, operatively coupled to the switching mechanism and operative to switch the switching mechanism to the first wireless receiver to receive information from the first wireless receiver during a synchronization period based on timing synchronization information from the first wireless system and to switch back to receiving information from the second wireless receiver after the synchronization period has ended.

4. The wireless multimode receiving device of claim 3 wherein the first wireless receiver is a cellular receiver and wherein the second wireless receiver is a digital broadcast receiver.

5. A network element for use in a system that communicates with a multimode receiving device comprising:
   a first wireless system transmitter operative to transmit information associated with the first wireless system to the multimode receiving device;
   an information gating buffer operatively coupled to the first wireless system transmitter; and
   a synchronization controller, operatively coupled to the information gating buffer and to receive timing synchronization information from a second wireless system wherein the synchronization information is associated with the second and different wireless system, wherein the first and second wireless systems are not synchronized in a time domain, and operative to use the timing synchronization information to control the information gating buffer to gate information for transmission from the first wireless system transmitter to the multimode receiving device.

6. The network element of claim 5 including at least one second wireless system receiver circuit, operatively coupled to the synchronization controller, and operative to wirelessly receive synchronization information associated with the second and different wireless system, and operative to provide timing synchronization data based on the synchronization information from the second wireless system.

7. The network element of claim 5 wherein using the timing synchronization information from the first wireless system to gate the transmission of information includes controlling the buffering by the information buffer during at least a portion of a synchronization period associated with the timing synchronization information.

8. The network element of claim 5 including a plurality of second wireless system receiver circuits, operatively coupled to the synchronization controller, and operative to wirelessly receive synchronization information associated with a plurality of second and different wireless systems, and operative to provide the timing synchronization data based on the synchronization information from each of the plurality of second wireless systems.

9. A network element for use in a system that communicates with a multimode receiving device comprising:

a digital broadcast transmitter operative to transmit digital broadcast information to the multimode receiving device;

a broadcast information gating buffer having an output operatively coupled to the digital broadcast transmission circuit and an input operatively coupled to receive information to be transmitted by the digital broadcast transmission circuit;

at least one cellular system receiver circuit, operative to wirelessly receive synchronization information associated with a cellular system, and operative to provide timing synchronization data based on the synchronization information from the cellular system; and a synchronization controller, operatively coupled to the broadcast information gating buffer and to the cellular system receiver circuit and operatively coupled to receive the timing synchronization data from the cellular system receiver circuit, wherein the digital broadcast system and cellular system are not synchronized in a time domain, and the synchronization controller is operative to use the timing synchronization data to control the information gating buffer to gate broadcast information for transmission from the digital broadcast transmitter to the multimode receiving device.

10. A method for communicating with a multimode receiving device that at least receives information from a first and a second wireless system, that are not synchronized in a time domain, comprising:

preceiving timing synchronization information from the first wireless system;

using the timing synchronization information from the first wireless system to gate a transmission of information transmitted from the second wireless system to the multimode receiving device; and wherein using the timing synchronization information from the first wireless system to gate the transmission of information includes controlling the buffering of data to be transmitted by the second wireless system during at least a portion of a synchronization period associated with the timing synchronization information associated with the first wireless system.

11. The method of claim 10 wherein gating of the transmission of information for the at least portion of the synchronization period includes gating information to be transmitted for a period longer than the synchronization period based on delay of signals experienced by multimode receiving device.

12. A wireless multimode receiving device comprising:

at least a first wireless receiver operative to receive wireless information from a first wireless system;

at least a second wireless receiver operative to receive wireless information from a second wireless system;

a switching mechanism, operatively coupled to the first and second wireless receivers;

control logic, operatively coupled to the switching mechanism and operative to switch the switching mechanism to the first wireless receiver to receive information from the first wireless receiver during a synchronization period based on timing synchronization information from the first wireless system and to switch back to receiving information from the second wireless receiver after the synchronization period has ended; and wherein the control logic switches to the second wireless receiver to receive gated information transmitted from the first wireless system that was gated, by a network element, based on timing synchronization information from the first wireless system.

\* \* \* \* \*